S. A. REEVE.
STAGE COMPRESSION INTERNAL COMBUSTION ENGINE.
APPLICATION FILED JUNE 30, 1905.
1,005,469.
Patented Oct. 10, 1911.
2 SHEETS—SHEET 2.
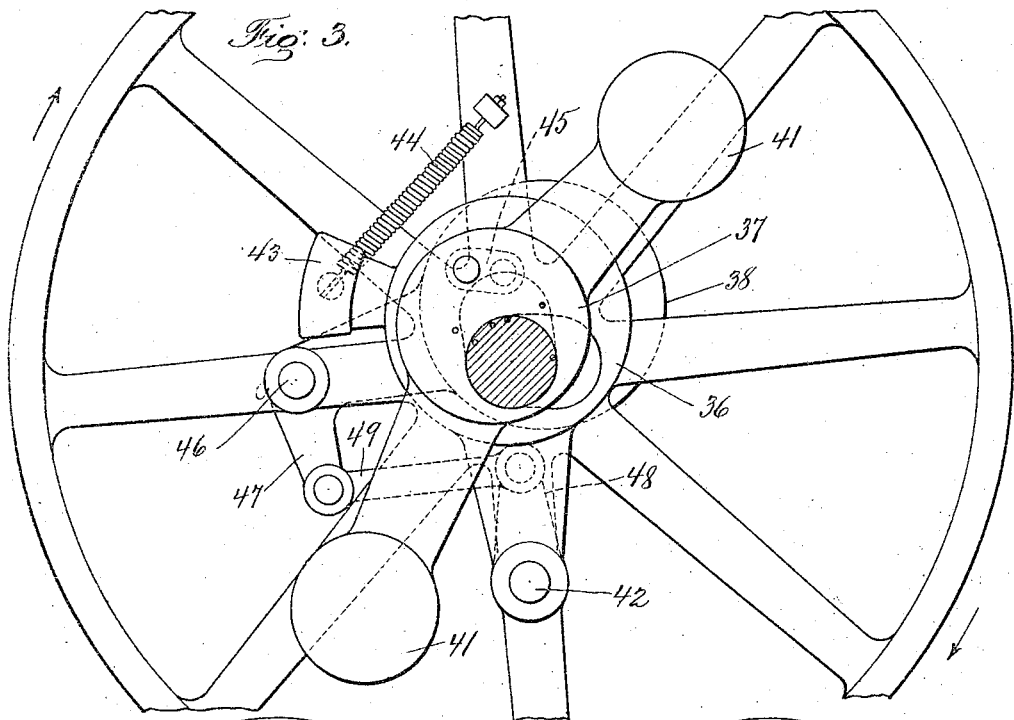
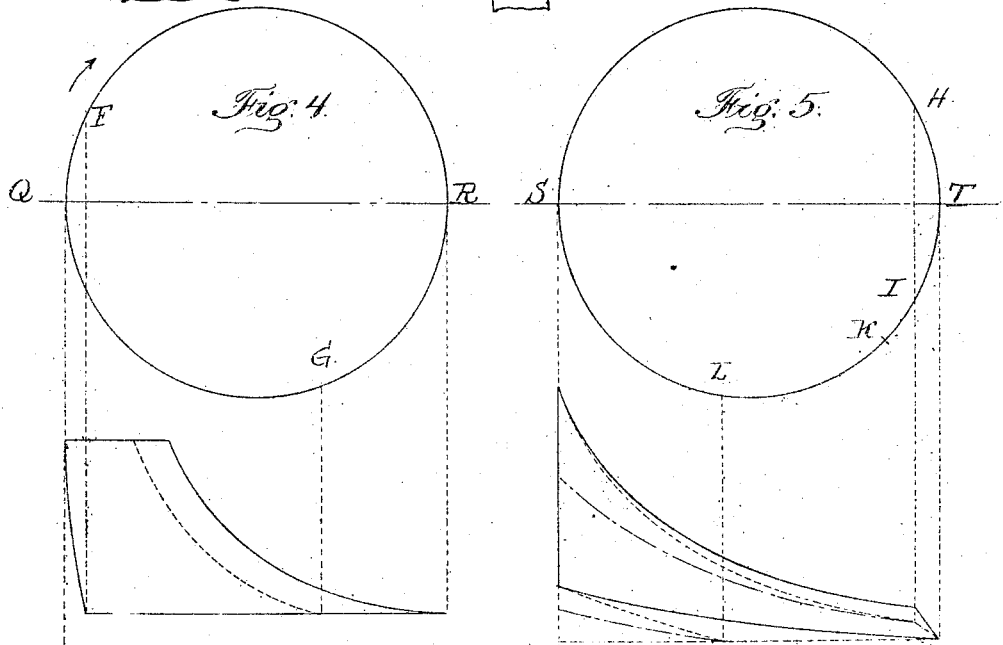
Witnesses:
L. S. Shaw
M. A. Moder
Inventor:
S. A. Reeve
by Bentley & Pierson
Atty's

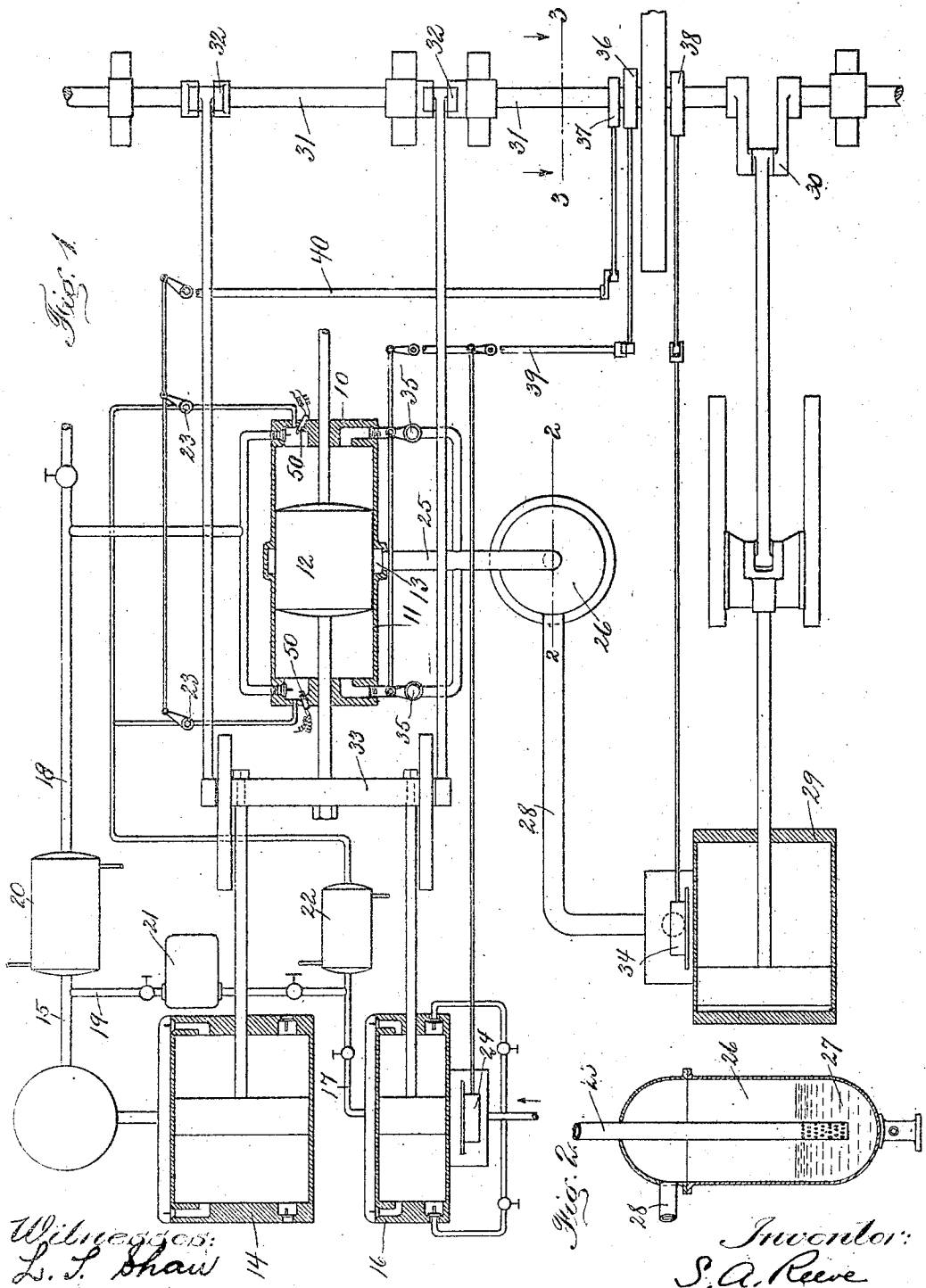

UNITED STATES PATENT OFFICE.

SIDNEY A. REEVE, OF WORCESTER, MASSACHUSETTS, ASSIGNOR, BY MESNE ASSIGNMENTS, TO C. P. POWER COMPANY, OF NEWARK, NEW JERSEY, A CORPORATION OF NEW JERSEY.

STAGE-COMPRESSION INTERNAL-COMBUSTION ENGINE.

1,005,469.  Specification of Letters Patent.  Patented Oct. 10, 1911.

Application filed June 30, 1905. Serial No. 267,719.

*To all whom it may concern:*

Be it known that I, SIDNEY A. REEVE, of Worcester, in the county of Worcester and State of Massachusetts, have invented certain new and useful Improvements in Stage-Compression Internal-Combustion Engines, of which the following is a specification.

This invention relates to the regulation of compound internal-combustion motors, and it consists in certain improvements of which a preferred embodiment will now be described.

Of the accompanying drawings: Figure 1 represents a diagrammatic view of an internal-combustion power apparatus constructed according to my invention. Fig. 2 represents a cross-section on the line 2—2 of Fig. 1, showing the cooling-chamber existing between the high-pressure and low-pressure motors. Fig. 3 represents an elevation of the governor taken on the line 3—3 of Fig. 1. Figs. 4 and 5 represent diagrams of the processes in the compressor and high-pressure motor cylinders respectively.

The same reference characters indicate the same parts in all the figures.

Referring at first to Fig. 1, 10 indicates a double-acting high-pressure motor including cylinder 11, piston 12, and exhaust-port 13 midway of the cylinder. 14 is an air-compressor supplying the two ends of the cylinder through a pipe 15, and 16 is a gas-compressor supplying the two ends through a pipe 17. The compressed air pipe 15 branches at 18, 19, the branch 18 leading directly to the motor-cylinder through an inter-cooler 20 supplied with circulating water, and the branch 19 leading to the compressed-gas pipe 17 through a device 21 which may represent either a carbureter or a gas-producer according to whether liquid fuel or solid fuel is to be supplied within the pressure circuit, instead of the preëxisting gaseous fuel compressed by compressor 16.
In such a case the gas-compressor 16 may be dispensed with or operated as an auxiliary air-compressor. The gas-pipe 17 contains a gas inter-cooler 22 provided with water-circulation, and its two branches leading to the opposite ends of the explosion-cylinder contain admission-valves 23, 23 operated from the crank-shaft 31. The gas-compressor 16 is also shown with a by-pass valve 24 operated from the crank-shaft and connecting opposite ends of the compressor cylinder, whereby the beginning of the compression stroke may be delayed and the output of the compressor diminished from its maximum, for regulative purposes. The exhaust-pipe 25 of the explosion-cylinder leads into a cooling-chamber 26 in which a pool of water is maintained by automatic feeding means or otherwise, and the hot explosion gases passing through the perforated lower end of the exhaust-pipe 25, have their temperature reduced and create a body of steam which passes with the exhaust gases through a pipe 28 leading from the upper part of the cooling chamber to the low-pressure motor 29. The latter is here shown as a double-acting reciprocating engine of the steam-engine type having its piston connected with a crank 30 on the same crank-shaft 31 with the cranks 32 of the high-pressure motor 10. The piston of the latter drives the pistons of compressors 14, 16 by a straight-line connection from a cross-head 33. The cranks 30 and 32 may be placed at an angle of 90°. 34 is the distributing-valve of the motor 24 operated from crank-shaft 31. 35, 35 are two auxiliary exhaust-valves for the explosion-cylinder 11, the function of which will be later described. 50, 50 are igniters of the usual character in the ends of cylinder 11.

The operation of the mechanism thus far described is as follows: Compressors 14 and 16 at each stroke draw in air and gas at substantially atmospheric pressure and compress them to a moderate pressure, say 6 atmospheres or 90 lbs. absolute. In the case of oil or solid fuel in the carbureter or producer 21, the gas-compressor 16 is out of use or acts as an auxiliary air-compressor, as already stated, and a portion of the compressed air becomes over-carbureted or fuel-charged in 21 and goes to the explosion-cylinder by way of the gas-admission pipe 17. A compression of something like 6 atmospheres or less represents the pressure at which the charge is fired in an ordinary gas-engine, but instead of igniting at this pressure, I lead the compressed charge into the explosion-cylinder 11 and here impart a further stage of compression, say in the same proportion to initial pressure as the first stage, that is, to one-sixth of its volume at the end of the first stage, giving a final pressure of 36 atmospheres or 540 lbs. absolute. These figures are illustrative merely, and may be more or less departed from in practice without varying the principle of operation. Between stages, the charge is cooled in the intercoolers 20, 22, and if that cooling restores to the partially-compressed charge its original temperature before compression, then, neglecting the effects of residual heat in cylinder 11, the second stage of compression, in the example given, will result in no higher temperature than the first stage. By this means I avoid pre-ignition of the charge which might occur on the compression-stroke of piston 12 if the charge had entered cylinder 11 at an initial high temperature, and furthermore I considerably reduce the work of compression by removing the compression-heat between stages. That heat could not be effectively removed for either purpose by merely water-jacketing the compressors, which merely keeps the rubbing surfaces smooth and permits proper lubrication. At the top of the compression-stroke in the explosion-cylinder 11 the charge is fired by the igniter 50, is partially expanded while doing work on piston 12 and at the end of the outstroke is exhausted through port 13, pipe 25, cooling-chamber 26, and pipe 28 into the low-pressure engine 29, where the mixture of steam and products of combustion, still under a pressure approximating the intercooler-pressure of 6 atmospheres, expands still further while doing work and is finally exhausted to atmosphere or into a condenser. The increase in pressure caused by explosion is in substantially the same ratio to the compression as in ordinary Otto engines, but since it takes place from a compression pressure of 540 lbs. absolute or thereabout, the result is a maximum explosion pressure of from 2000 to 2500 lbs. per square inch or more in place of the ordinary maximum of about 500 lbs. experienced in single-cylinder engines. This enormous pressure could obviously not be handled practically in a single expansion cylinder, but it can be very easily handled by making the explosion-cylinder of relatively-small diameter and strong construction, and exhausting into a larger (or faster-running) low-pressure engine. The low-pressure engine might be a turbine, or might be either a turbine or reciprocating motor disconnected from the crank-shaft of the explosion motor. The employment of a disconnected or independently-running low-pressure expander has certain special advantages which need not be here alluded to as I have set them forth in a co-pending application, Serial No. 349,019. If the low-pressure engine 29 is placed close to the high-pressure motor 10 with a short connecting passage, the water cooling-chamber 26 may be omitted, but I prefer to employ it or some equivalent since the conversion of the high-temperature heat into steam heat gives a fluid which may be transported through a comparatively-long passage and does not readily lose its heat to passage-walls or cylinder-walls. When the exhaust-port 13 of the explosion-cylinder is uncovered by piston 12, admission of the next charge takes place from the pipes 17, 18 and the entering charge blows out the residue of the exploded gases after the manner of Clerk 2-stroke-cycle engines. There is an important difference between the function of the pre-compressor in the two cases, however. In the ordinary 2-cycle engine the pre-compressor merely acts as a displacer-cylinder whose charge is blown down to atmospheric pressure when the exhaust and admission ports are opened at the termination of the expansion stroke, the compression being then begun again from the atmospheric level, while in my invention the pre-compressor performs the first stage in a plural-stage compression which is completed in the explosion-cylinder and the admission takes place against a strong back-pressure existing in the exhaust-pipe of the high-pressure motor. The proportions of the high-pressure motor and the pre-compressor are also altered, my high-pressure motor being smaller in diameter relatively to the compressor since it takes a charge compressed into a smaller compass than the full volume of the initial compressor-cylinder. My invention is not wholly confined to the 2-stroke cycle since the high-pressure motor may be of the 4-stroke cycle type.

It will be noted that by making the high pressure motor perform the final stage of a plural-stage compression I do away with one compressor-cylinder which would have to be added if the maximum compression-pressure were reached before entrance of the charge into the combustion-cylinder. With respect to the volumetric performances of the high-pressure motor in relation to both the external compressor and the external expander, it is to be noted that this relation depends both upon the relative geometric dimensions of these members and also their relative numbers of strokes or cycles, and that I may vary both the time factor and the geometric factor in these relations without disturbing the relations themselves. Thus a turbine low-pressure expander would in general be of smaller relative dimensions and greater shaft-speed than a reciprocating engine.

For regulative purposes I show speed-governing of the gas-compressor output, the gas-admission and exhaust of the explosion-cylinder, and the cut-off of the low-pressure expander. An eccentric 36 on crank-shaft 31 operates the gas-compressor by-pass valve 24 and the auxiliary exhaust-valves 35. Another eccentric 37 operates the gas admission-valves 23, and a third eccentric 38 operates the low-pressure distributing valve 34. These are all linked together and actuated by a combination centrifugal and inertia shaft-governor as shown in Fig. 3, which arrangement, although believed to be new with me is not claimed in the present application. Eccentric 37 is pivoted on the shaft 31 and provided with inertia weights 41. A link 45 connects it with eccentric 36 which is pivoted at 42 and provided with centrifugal weight 43 and spring 44. The eccentric 38 is pivoted at 46 and has an arm 47 connected by link 49 with an arm 48 on the pintle of eccentric 36. The constant changes of acceleration in passing through the four quadrants, affecting the weights 41, overcome the static friction of all the eccentrics and enable them to assume their proper average position under the influence of centrifugal force acting on the weight 43.

At full load, the compressor by-pass valve 24 and the auxiliary exhaust-valves 35 preferably do not open, and the admission-valves 23 and distributing-valve 34 have their longest opening. In Figs. 4 and 5 the full-line diagrams represent the indicator-cards for the gas-compressor and the explosion cylinders respectively under these circumstances. Q R and S T indicate the dead-center lines. At light loads the gas-compressor by-pass valve 24 remains open during the early part of the compression-stroke and the compressor suction, instead of being open only through the arc F R (Fig. 4) is open through an arc like F R G and the output of combustible gas is accordingly decreased and the power of the explosion cylinder diminished. At such times it is desirable to provide an earlier cut-off of the low pressure expander 29 in order to maintain the pressure in cooling-chamber 26 constant or in stable equilibrium and this is done by the governor action on valve 34. On the explosion cylinder diagram (Fig. 5) the arc H I represents that portion of the stroke during which the exhaust-port 13 is open. At light loads, by reason of the opening of the auxiliary exhaust-valves through governor-action, the exhaust might be opened through an arc H K L, and by the same governor-action, the gas-admission valves 23 would be opened and closed late, or through only the latter part of arc H K L. Since the air-compressor as here shown is not governed, but delivers the same output at all loads, and only a portion of the air can be burned with fuel, which latter has been decreased in quantity, the excess air may be sent ahead of the fuel through the explosion-cylinder, to scavenge the latter. Scavenging would then take place through an arc like H K and admission of fuel to form a combustible mixture with the air remaining in the explosion cylinder, through the arc K L.

The above regulative mechanism is suitable for a constant-speed engine. For a variable-speed machine, essentially the same valve-mechanism may be employed, preferably modified however by substituting hand or other controlling influence for the centrifugal governor.

Owing to my novel arrangement of parts, the pressure of the scavenging air is not lost, but does useful work in the low-pressure cylinder 29 and this air receives some heat by passing through the explosion cylinder and passages.

This engine may be regulated through wider limits than the ordinary explosion engine, because a considerable portion of its total power is developed in a low-pressure expander of steam-engine form, capable of receiving steam-engine regulation, which as is well known, may be more nearly approximated to the load, while the engine is capable of wider variations of speed under heavy load, than is the ordinary gas-engine.

I claim:—

1. The combination of a two-stroke cycle explosion motor having serially-related high-pressure explosion and low-pressure expansion cylinders and their pistons, external means for charging said high-pressure cylinder with air and fuel under pressure, means for holding the high-pressure exhaust open to the low-pressure cylinder for a variable part of the cycle to scavenge and charge the high-pressure cylinder, and means for admitting fuel to the latter during a period inversely related to the duration of exhaust opening.

2. The combination of an intermittent-firing internal-combustion high-pressure motor, means, including a fixed-intake air-compressor, for charging the same with air and fuel under pressure, a low-pressure motor operated by the pressure of the exhaust gases from said high-pressure motor, and means controlled automatically according to the load on said high-pressure motor for sending a variable portion of the compressed air unburned to the low-pressure motor.

3. The combination of an intermittent-firing internal-combustion high-pressure motor, an air-compressor and separate fuel-charging means for said motor, a low-pressure motor operated by the pressure of the exhaust gases from said high-pressure motor, and means for sending a variable portion of the output of said compressor unburned to the low-pressure motor and conjointly varying the quantity of fuel-charge to the high-pressure motor.

4. The combination of an explosion motor adapted to exhaust against a back-pressure, an external compressor for charging the same, and means controlled by the speed of said motor for simultaneously and inversely varying the intake of the compressor and the freedom of the motor exhaust.

In testimony whereof I have affixed my signature, in presence of two witnesses.

SIDNEY A. REEVE.

Witnesses:
 Jas. H. Churchill,
 J. Murphy.

---

Copies of this patent may be obtained for five cents each, by addressing the "Commissioner of Patents, Washington, D. C."